United States Patent
Cho et al.

(10) Patent No.: US 10,256,499 B2
(45) Date of Patent: Apr. 9, 2019

(54) APPARATUS FOR WINDING ELECTRODE ASSEMBLY

(71) Applicant: SAMSUNG SDI CO., LTD., Yongin-si, Gyeonggi-do (KR)

(72) Inventors: Jaekyung Cho, Yongin-si (KR); Hyunsang Joo, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 281 days.

(21) Appl. No.: 15/183,665

(22) Filed: Jun. 15, 2016

(65) Prior Publication Data

US 2017/0133703 A1 May 11, 2017

(30) Foreign Application Priority Data

Nov. 10, 2015 (KR) ......................... 10-2015-0157468

(51) Int. Cl.
*H01M 10/00* (2006.01)
*H01M 10/04* (2006.01)

(52) U.S. Cl.
CPC ............................ *H01M 10/0409* (2013.01)

(58) Field of Classification Search
CPC ......... H01M 10/0413; H01M 10/0431; H01M 10/0409
See application file for complete search history.

(56) References Cited

U.S. PATENT DOCUMENTS

| 4,158,300 | A | * | 6/1979 | Hug | H01M 10/0409 29/623.1 |
|---|---|---|---|---|---|
| 5,091,273 | A | * | 2/1992 | Hug | H01M 6/10 29/623.4 |
| 5,323,527 | A | * | 6/1994 | Ribordy | H01M 6/10 29/623.1 |
| 9,871,266 | B2 | * | 1/2018 | Choi | H01M 10/0409 |
| 2003/0140482 | A1 | * | 7/2003 | Murata | H01M 10/0409 29/623.1 |
| 2011/0297780 | A1 | * | 12/2011 | Feng | H01M 6/005 242/444 |
| 2014/0117141 | A1 | * | 5/2014 | Kim | H01M 10/0409 242/439.4 |
| 2016/0197372 | A1 | * | 7/2016 | Sawada | H01M 2/1686 429/246 |

FOREIGN PATENT DOCUMENTS

| JP | 2003-146538 | 5/2003 |
|---|---|---|
| KR | 10-2012-0057438 | 6/2012 |
| KR | 10-2013-0080759 | 7/2013 |
| KR | 10-2014-0015994 | 2/2014 |

* cited by examiner

*Primary Examiner* — Emmanuel M Marcelo
(74) *Attorney, Agent, or Firm* — Lewis Roca Rothgerber Christie LLP

(57) ABSTRACT

An apparatus for winding an electrode assembly includes a winding unit including a motor unit to supply a winding power; a cam unit connected to the motor unit and configured to rotate when the motor unit supplies the winding power; a power transmission unit connected to the cam unit; and a mandrel connected to the power transmission unit and configured to receive a first electrode plate, a second electrode plate, and a separator wound thereon.

10 Claims, 7 Drawing Sheets

APPARATUS FOR WINDING ELECTRODE ASSEMBLY

CROSS-REFERENCE TO RELATED APPLICATION

This application claims priority to and the benefit of Korean Patent Application No. 10-2015-0157468, filed on Nov. 10, 2015 in the Korean Intellectual Property Office, the entire content of which is herein incorporated by reference.

BACKGROUND

1. Field

Aspects of embodiments of the present invention relate to an apparatus for winding an electrode assembly.

2. Description of the Related Art

Unlike a primary battery, a rechargeable battery may be repeatedly charged and discharged. Low capacity batteries having a single battery cell packaged in a pack type may be used for various portable electronic devices, such as cellular phones or camcorders, for example. High capacity batteries may be used as a power source for motor drives, such as in electric bikes, electric scooters, hybrid vehicles, or electric vehicles, for example.

Rechargeable batteries may be classified into different types, such as cylindrical batteries and prismatic batteries. The rechargeable battery is generally constructed by accommodating an electrode assembly having a positive electrode and a negative electrode with a separator as an insulator interposed therebetween in a case together with an electrolyte.

An electrode assembly may be fabricated by winding a stack including a positive electrode plate, a negative electrode plate, and a separator into a jelly roll shape. In the course of winding the electrode assembly, tension applied to the electrode plates may vary according to the angle of a mandrel, which may degrade quality of the electrode assembly. Therefore, there is a need to develop means for improving winding quality of the electrode assembly.

SUMMARY

According to an aspect of embodiments of the present invention, an apparatus for winding an electrode assembly can constantly adjust a winding speed.

The above and other aspects of embodiments of the present invention will be described in or will be apparent from the following description of some exemplary embodiments.

According to one or more embodiments of the present invention, an apparatus for winding an electrode assembly includes a winding unit including a motor unit to supply a winding power; a cam unit connected to the motor unit and configured to rotate when the motor unit supplies the winding power; a power transmission unit connected to the cam unit; and a mandrel connected to the power transmission unit and configured to receive a first electrode plate, a second electrode plate, and a separator wound thereon.

The cam unit may include a disk-shaped base cam connected to the motor unit; a cam follower at a side of a surface of the base cam; and a mandrel driving cam having one end connected to the cam follower and another end connected to the power transmission unit.

The mandrel driving cam may have a hole at the one end, and the cam follower may be inserted in the hole to be connected to the mandrel driving cam, the cam follower being configured to move through the hole while rotating.

The mandrel driving cam may rotate about a different rotational axis than the base cam.

When the cam follower may be located closest to the rotational axis of the mandrel driving cam, the mandrel may be positioned to be parallel with a direction in which a base member including the first electrode plate, the second electrode plate, and the separator stacked on the mandrel is supplied, and when the cam follower is located farthest away from the rotational axis of the mandrel driving cam, the mandrel may be positioned to be perpendicular to the direction in which the base member including the first electrode plate, the second electrode plate, and the separator stacked on the mandrel is supplied.

The power transmission unit may include a first roller, a second roller, and a belt, a circumference of the first roller may be two times a circumference of the second roller, and the first roller and the second roller may be connected by the belt.

The mandrel driving cam may include a cam follower coupling unit, a rotational axis coupling unit and a link unit, the cam follower may pass through one end of the cam follower coupling unit to be coupled thereto and rotate, the rotational axis coupling unit may be connected to the power transmission unit, and the link unit may connect the cam follower coupling unit with the rotational axis coupling unit.

The cam unit may include a base cam including a first gear connected to the motor unit, and a second gear connected to the first gear; a chain connecting the first gear and the second gear to each other; and a mandrel driving cam including one end connected to the chain and another end connected to the power transmission unit.

The mandrel driving cam may include a chain coupling unit, a rotational axis coupling unit and a link unit, one end of the chain coupling unit may be coupled to the chain, the rotational axis coupling unit may be connected to the power transmission unit, and the link unit may connect the chain coupling unit with the rotational axis coupling unit.

The mandrel driving cam may rotate about a same rotational axis as the base cam.

The mandrel may have a plate shape.

According to an aspect of embodiments of the present invention, an apparatus for winding an electrode assembly includes a cam capable of adjusting a rotational speed of a mandrel on which a base member including a positive electrode plate, a negative electrode plate, and a separator is wound to maintain a winding speed of a base member and tension applied to the base member, thereby improving winding quality of the electrode assembly.

BRIEF DESCRIPTION OF THE DRAWINGS

The above and other aspects of the present invention will become more apparent by describing in further detail some exemplary embodiments with reference to the attached drawings in which.

DETAILED DESCRIPTION

Figure 1:
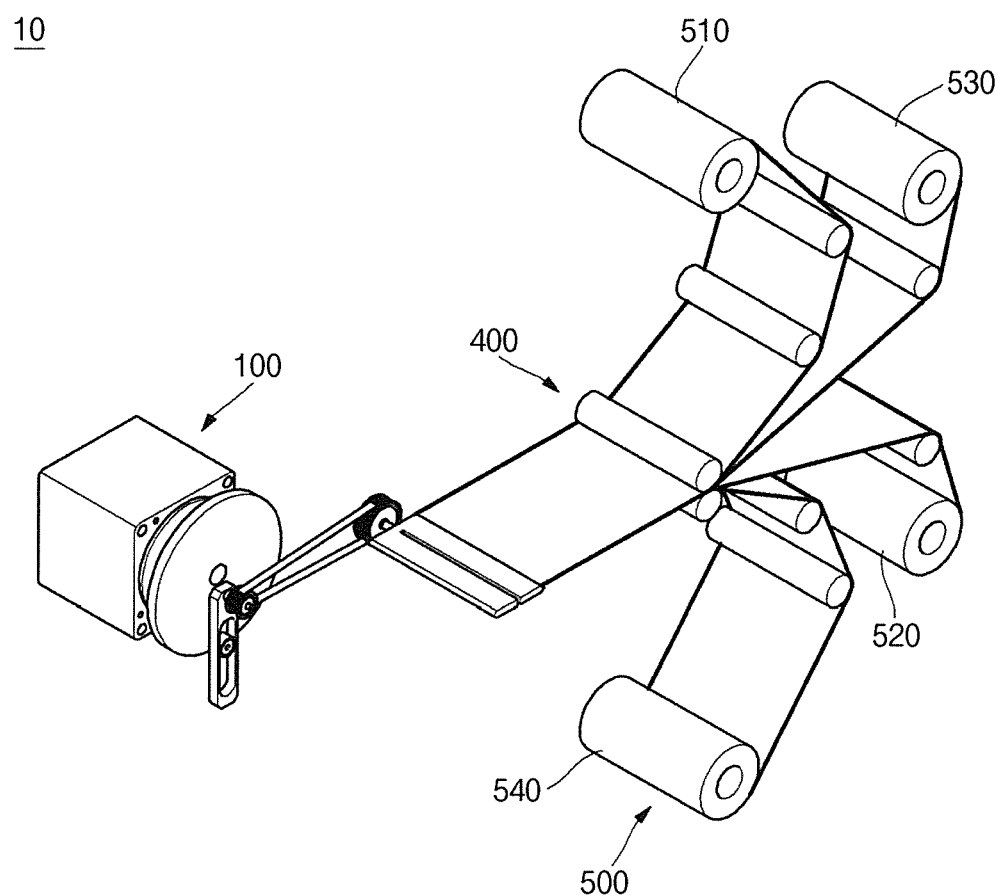
FIG. 1 is a schematic view illustrating an apparatus for winding an electrode assembly according to an embodiment of the present invention.

Hereinafter, some exemplary embodiments of the present invention will be described in further detail with reference to the accompanying drawings such that they can easily be made and used by those skilled in the art.

The present invention may, however, be embodied in many different forms and should not be construed as being limited to the embodiments set forth herein. Rather, these embodiments are provided so that this disclosure will be thorough and complete and will fully convey the concept of the invention to those skilled in the art.

In the drawings, the thickness of layers and regions may be exaggerated for clarity. Like numbers refer to like elements throughout. As used herein, the term "and/or" includes any and all combinations of one or more of the associated listed items. It will also be understood that when an element A is referred to as being "connected to" an element B, the element A may be directly connected to the element B or an intervening element C may be present and the element A and the element B may be indirectly connected to each other.

The terminology used herein is for the purpose of describing particular embodiments and is not intended to be limiting of the invention. As used herein, the singular forms are intended to include the plural forms as well, unless the context clearly indicates otherwise. It will be further understood that the terms "comprise," "comprising," "include," and/or "including" when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," etc. may be used herein to describe various members, elements, regions, layers and/or sections, these members, elements, regions, layers and/or sections should not be limited by these terms. Rather, these terms are used to distinguish one member, element, region, layer and/or section from another. Thus, for example, a first member, a first element, a first region, a first layer and/or a first section discussed below could be termed a second member, a second element, a second region, a second layer and/or a second section without departing from the teachings of the present disclosure.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "on" or "above" the other elements or features. Thus, the exemplary term "below" can encompass both an orientation of above and below.

FIG. 1 is a schematic view illustrating an apparatus for winding an electrode assembly according to an embodiment of the present invention.

Referring to FIG. 1, an electrode assembly winding apparatus 10 according to an embodiment of the present invention may include a winding unit 100, a stacking unit 400, and a supply unit 500.

In use, the winding unit 100 winds a base member 150 supplied from the stacking unit 400 on a mandrel 140. The winding process will be described later in further detail.

In use, the stacking unit 400 stacks a first electrode plate, a second electrode plate, and a separator supplied from the supply unit 500 using a nip roller. The base member 150 including a stack of the first electrode plate, the second electrode plate, and the separator is transferred to the winding unit 100.

The supply unit 500 may include a first supply roller 510, a second supply roller 520, a third supply roller 530, and a fourth supply roller 540. In use, the first supply roller 510 unrolls the first electrode plate and supplies the unrolled first electrode plate to the stacking unit 400, the second supply roller 520 unrolls the second electrode plate and supplies the unrolled second electrode plate to the stacking unit 400, and the third supply roller 530 and the fourth supply roller 540 unroll the separator and supply the unrolled separator to the stacking unit 400. Therefore, the wound electrode assembly is formed such that the separator is interposed between the first electrode plate and the second electrode plate.

Figure 2:
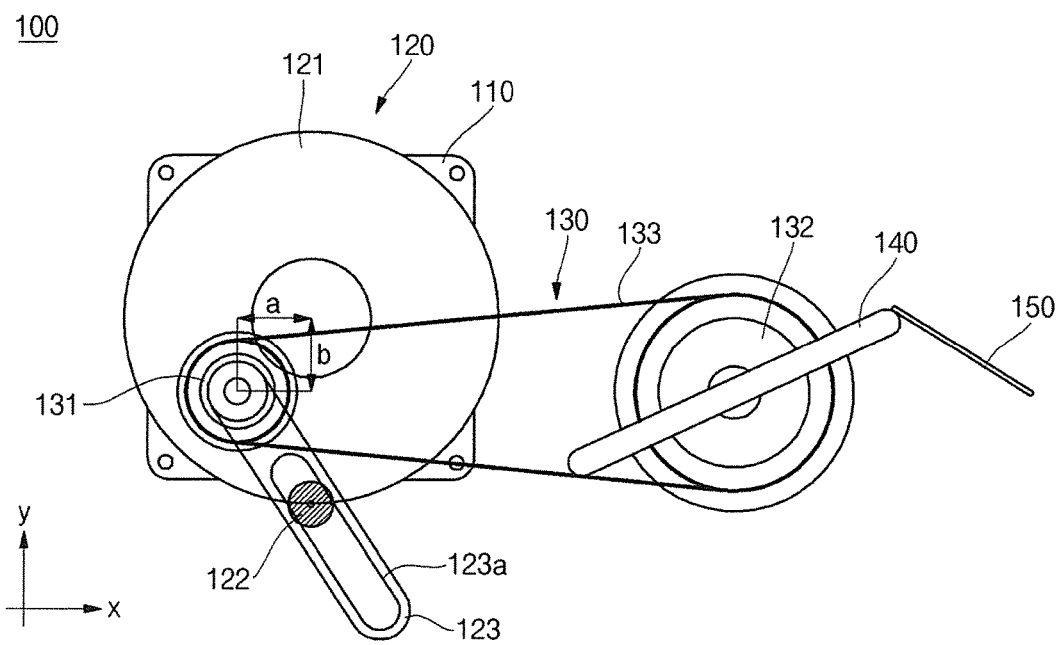
FIG. 2 is a side view of a winding unit of the electrode assembly winding apparatus illustrated in FIG. 1.

FIG. 2 is a side view of a winding unit of the electrode assembly winding apparatus illustrated in FIG. 1.

Referring to FIG. 2, according to an embodiment of the present invention, the winding unit 100 may include a motor unit 110, a cam unit 120, a power transmission unit 130, and the mandrel 140 for winding the base member 150.

The motor unit 110 may supply power for winding the base member 150 on the mandrel 140. The motor unit 110 may include a motor and transfers the power for producing a constant angular speed to the cam unit 120.

The cam unit 120 may include a base cam 121, a cam follower 122, and a mandrel driving cam 123.

The base cam 121 may be substantially disk-shaped. The center of a surface of the base cam 121 is connected to the motor unit 110. Therefore, the power from the motor unit 110 is transferred to the base cam 121, such that the base cam 121 rotates about the center as a rotational axis.

The cam follower 122 may be a protrusion having a substantially cylindrical shape. The cam follower 122 may be fixed to an edge of another surface of the base cam 121, such that the cam follower 122 rotates about the center of the base cam 121 as a rotational axis along the base cam 121.

The mandrel driving cam 123 may be substantially bar-shaped. A hole 123a through which the cam follower 122 passes is formed at one end of the mandrel driving cam 123. The hole 123a is elongated in a direction extending from one end of the mandrel driving cam 123 toward the center. The cam follower 122 is inserted into the hole 123a to then rotate and may move along a lengthwise direction (e.g., up and down) of the hole 123a.

The other end of the mandrel driving cam 123 is fixed to the power transmission unit 130, such that the power transferred to the base cam 121 is transferred to the power transmission unit 130. In one embodiment, the other end of the mandrel driving cam 123 connected to the power transmission unit 130 is fixed to a first roller 131 of the power transmission unit 130, which is a different rotational axis from that of the base cam 121.

The rotational axis of the mandrel driving cam 123 may be spaced distances a and b apart from the rotational axis of the base cam 121 in the x- and y-axis directions, respectively. When the cam follower 122 is located closest to the rotational axis of the mandrel driving cam 123 on a line of the same direction as the rotational axis of the mandrel driving cam 123 with respect to the rotational axis of the base cam 121, the first roller 131 of the power transmission unit 130 and the mandrel 140 connected thereto are rotated at maximum speeds. In addition, when the cam follower 122 is located farthest away from the rotational axis of the mandrel driving cam 123 on a line of the opposite direction to the rotational axis of the mandrel driving cam 123 with respect to the rotational axis of the base cam 121, the first roller 131 of the power transmission unit 130 and the mandrel 140 are rotated at minimum speeds. Therefore, positions of the cam follower 122 at which the mandrel 140 is rotated at maximum and minimum rotational speed may be different according to the distances a and b.

According to an embodiment, when the mandrel 140 is positioned to be parallel with the x-axis direction, the base member 150 is wound on the mandrel 140 at a minimum speed, and when the mandrel 140 is positioned to be parallel with the y-axis direction, the base member 150 is wound on the mandrel 140 at a maximum speed.

Therefore, in order to minimize the winding speed of the base member 150 and a difference in the tension applied to the base member 150, when the cam follower 122 is located closest to the rotational axis of the mandrel driving cam 123, the mandrel 140 should be positioned to be parallel with the x-axis, and when the cam follower 122 is located farthest away from the rotational axis of the mandrel driving cam 123, the mandrel 140 should be positioned to be parallel with the y-axis, which will later be described in more detail.

According to an embodiment, the power transmission unit 130 may include the first roller 131, a second roller 132, and a belt 133.

The rotational axis of the first roller 131 is fixed to an end at which the rotational axis of the mandrel driving cam 123 is formed. Therefore, the power transferred from the base cam 121 to the mandrel driving cam 123 is transferred to the first roller 131, such that the base cam 121 rotates together with the mandrel driving cam 123.

According to an embodiment, the second roller 132 is connected to the first roller 131 through the belt 133. Therefore, the power transferred to the first roller 131 is transferred to the second roller 132 through the belt 133, and the second roller 132 rotates accordingly. In one embodiment, when the first roller 131 rotates once, the second roller 132 rotates a half cycle, and the circumference of the second roller 132 is two times the circumference of the first roller 131. The rotation process of the first roller 131 and the second roller 132 will be described later in further detail.

According to an embodiment, the mandrel 140 may be shaped as a plate. One end of the mandrel 140 is connected to the second roller 132. Therefore, the power transferred to the second roller 132 is transferred to the mandrel 140, and the mandrel 140 rotates.

According to an embodiment, the base member 150 is supplied to the winding unit 100 in a direction parallel to the x-axis. The base member 150 may be connected to a lateral surface of the mandrel 140 and may be wound on the lateral surface of the mandrel 140 according to the rotation of the mandrel 140. The base member 150 is wound around the mandrel 140 to form an electrode assembly.

A process of winding the base member 150 on the mandrel 140 according to an embodiment of the present invention will be described below in further detail.

Figure 3:
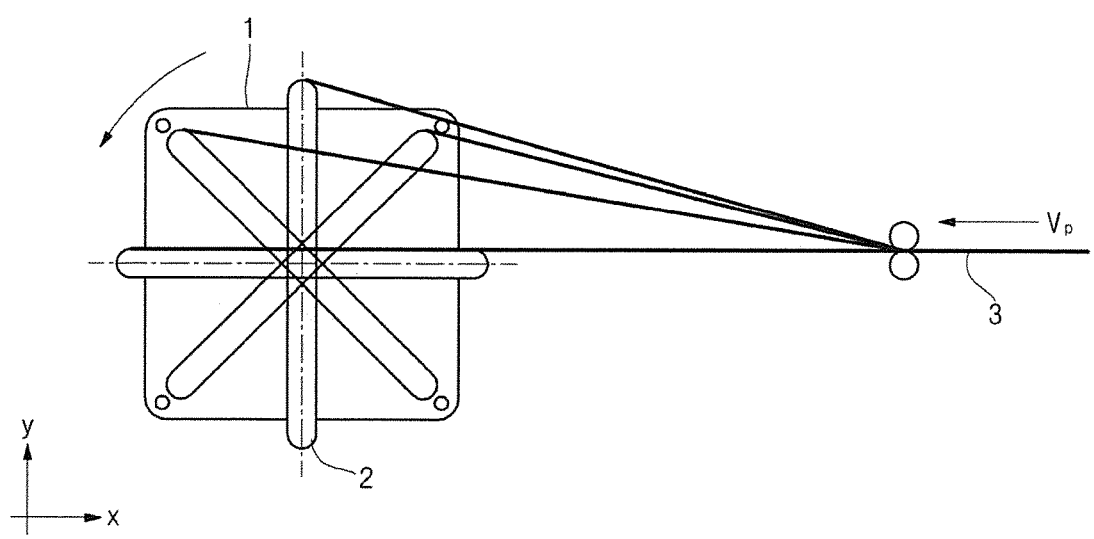
FIG. 3 is a view illustrating a state in which a mandrel to which the present invention is not applied and a base member are engaged with each other.
Figure 4:
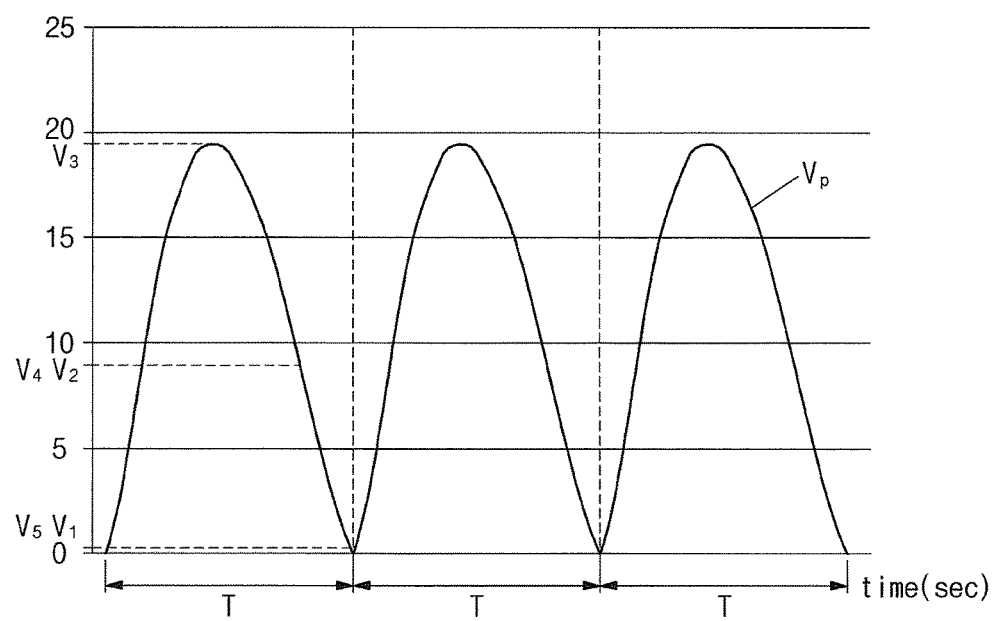
FIG. 4 is a graph illustrating a transfer speed of a base member when a mandrel assembled with a motor unit to which the present invention is not applied is rotated at normal speeds.

FIG. 3 is a view illustrating a state in which a mandrel to which the present invention is not applied and a base member are engaged with each other; and FIG. 4 is a graph illustrating transfer speeds of a base member when a mandrel combined with a motor unit to which the present invention is not applied is rotated at normal speeds.

Referring to FIGS. 3 and 4, a constant angular speed of a motor unit 1 is transferred to a mandrel 2, such that the mandrel 2 rotates at the constant angular speed.

Since the mandrel 2 is plate-shaped, the base member 3 is wound on the mandrel 2 at variable speeds according to a position of the mandrel 2. Meanwhile, the winding speed of the base member 3 is equal to the transfer speed of the base member 3. Accordingly, a transfer speed Vp of the base member 3 may change from V1 to V2, V3, V4 and to V5.

When the mandrel 2 rotates 180° counterclockwise, which is to be defined as one cycle (T), the transfer speed Vp of the base member 3 relatively varies to be V1, V2, V3, V4, and V5.

When the mandrel 2 is positioned to be parallel to the x-axis, the transfer speed V1 of the base member 3 becomes a minimum transfer speed. When the mandrel 2 is in the first quadrant between the x-axis and the y-axis, the transfer speed V2 of the base member 3 is greater than the minimum transfer speed V1. When the mandrel 2 is positioned to be parallel to the y-axis, the transfer speed V3 of the base member 3 becomes a maximum transfer speed. When the mandrel 2 is positioned in the second quadrant between the x-axis and the y-axis, the transfer speed V4 of the base member 3 is less than the maximum transfer speed V3. When the mandrel 2 is positioned again to be parallel to the x-axis, the transfer speed V5 of the base member 3 becomes a minimum transfer speed again. That is, there is a difference in the transfer speed of the base member 3 according to the position of the mandrel 2.

Figure 5A:
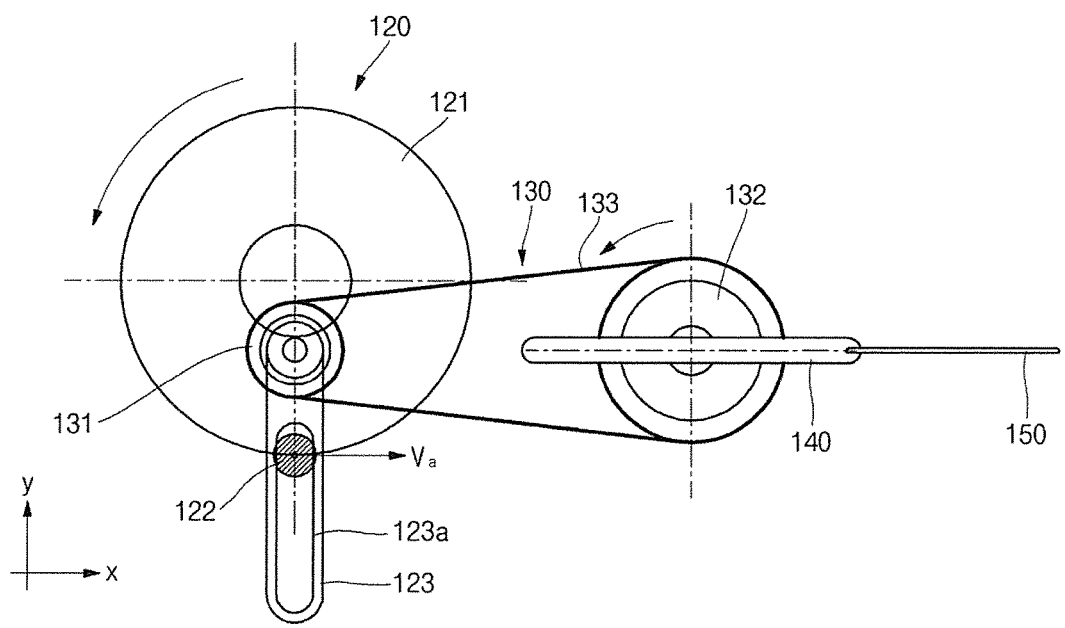
FIGS. 5A to 5E are views sequentially illustrating a winding process of the electrode assembly winding apparatus illustrated in FIG. 1.
Figure 5B:
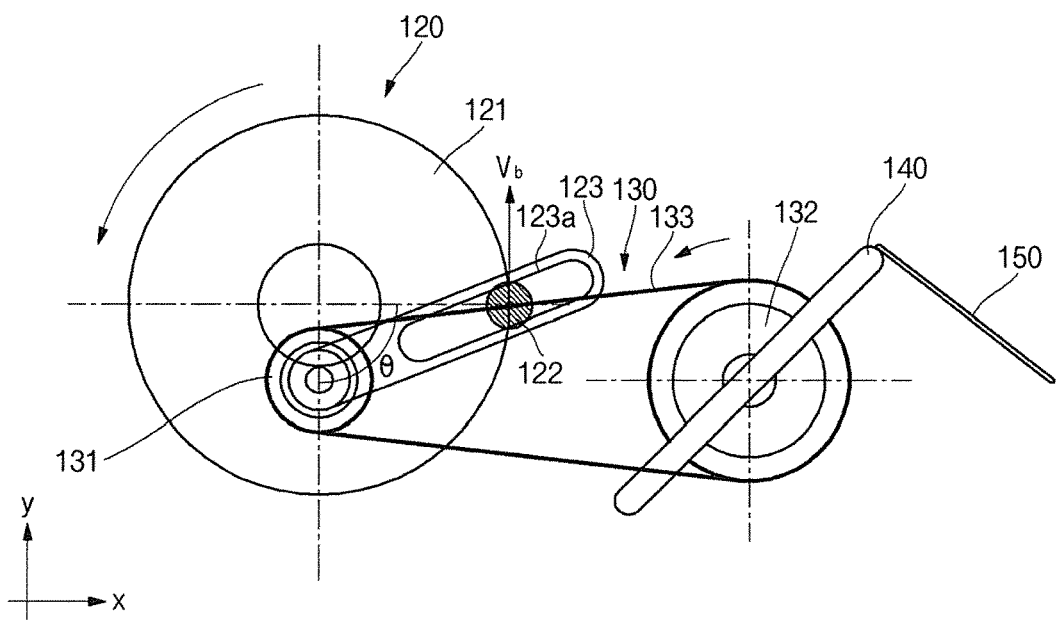
Figure 5C:
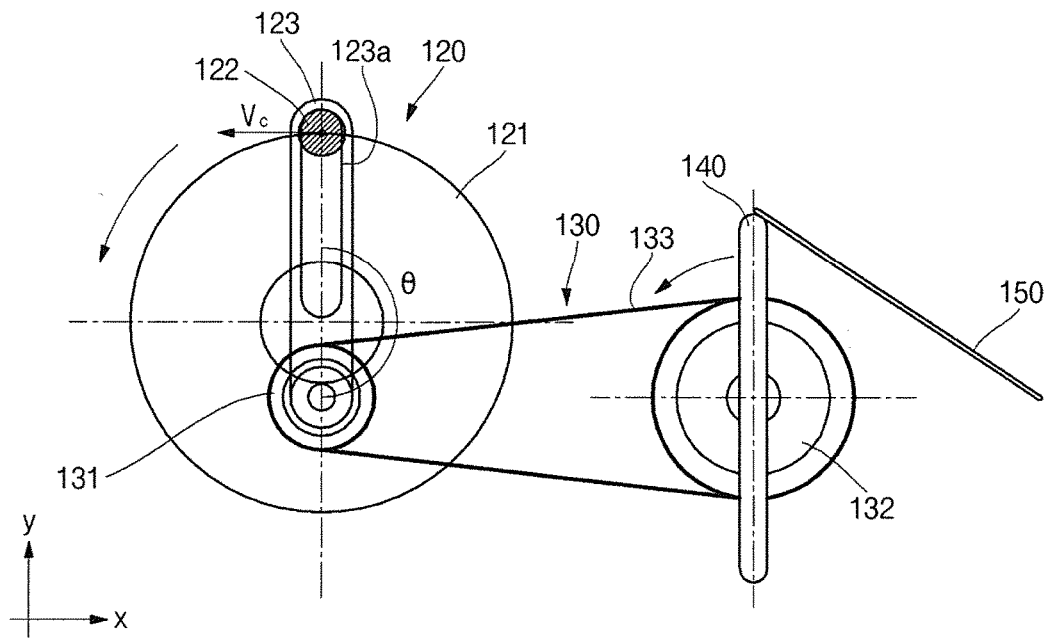
Figure 5D:
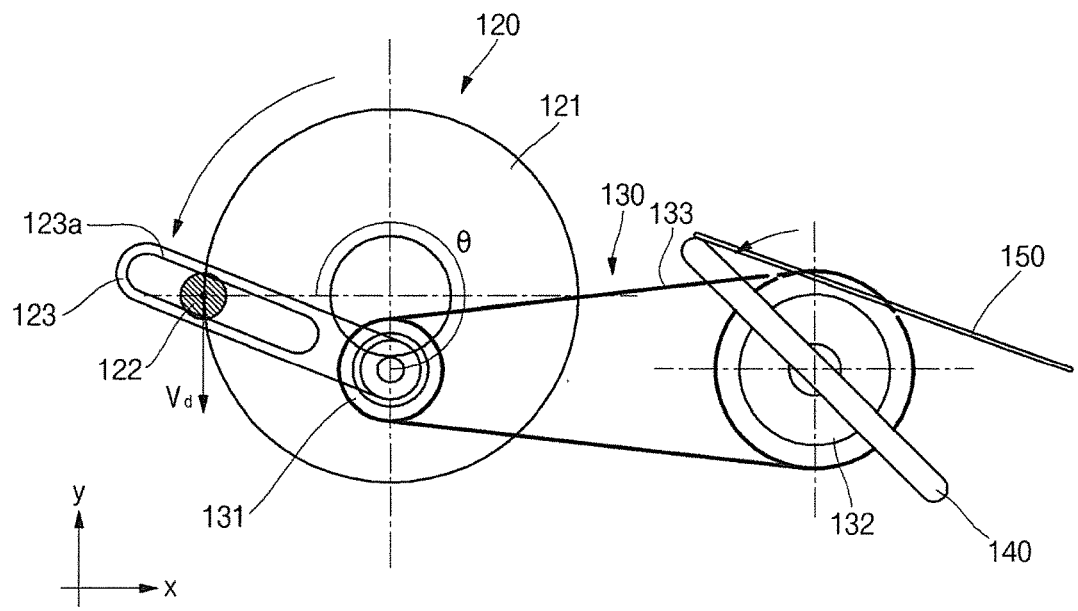
Figure 5E:
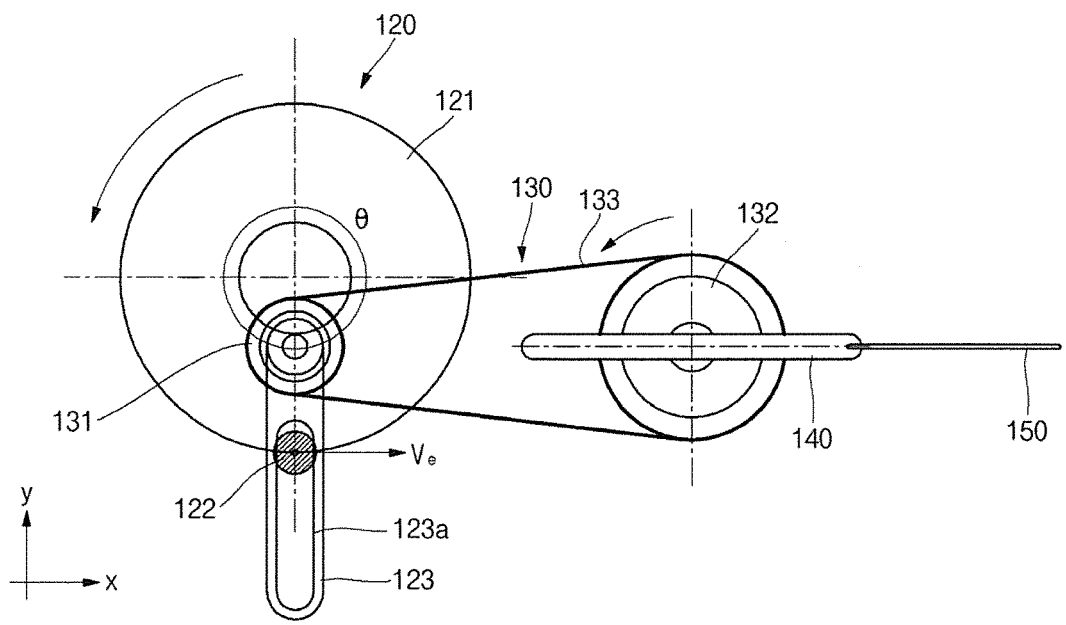
Figure 6:
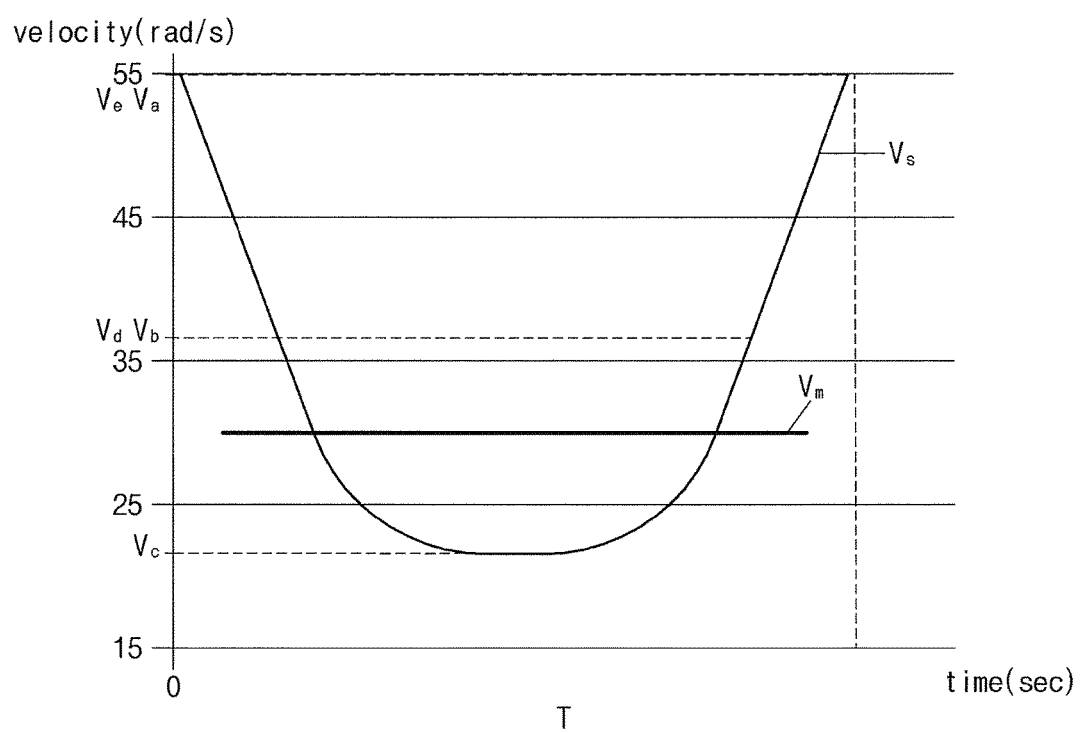
FIG. 6 is a graph illustrating transfer speeds of a base member when a motor unit of an apparatus for winding an electrode assembly according to an embodiment of the present invention is rotated at normal speeds.

FIGS. 5A to 5E are views sequentially illustrating a winding process of the electrode assembly winding apparatus 10 illustrated in FIG. 1, according to an embodiment of the present invention; and FIG. 6 is a graph illustrating transfer speeds of a base member when a motor unit of an apparatus for winding an electrode assembly according to an embodiment of the present invention is rotated at normal speeds.

Referring to FIGS. 5A to 5E, positions of the cam follower 122 may be represented by a varying angle θ of the cam follower 122 on the basis of the negative (−) direction of the y-axis using the rotational axis of the base cam 121 as the origin.

The rotational axis of the mandrel driving cam 123 may be spaced the distances a and b (see FIG. 2) apart from the rotational axis of the base cam 121 in the x- and y-axis directions, respectively. In the illustrated embodiment of FIGS. 5A to 5E, for explaining the winding process according to the present invention, the mandrel driving cam 123 is not spaced apart in the x-axis direction, that is, a=0.

When the cam follower 122 rotates 360° counterclockwise, which is to be defined as one cycle (T), a rotational speed Vs of the mandrel driving cam 123 relatively varies to be Va, Vb, Vc, Vd, and Ve.

Referring to FIG. 5A, the angle θ of the cam follower 122 is 0° and the mandrel 140 is positioned to be parallel to the x-axis.

When the cam follower 122 is located closest to the rotational axis of the mandrel driving cam 123, the rotation radius with respect to the rotational axis of the mandrel driving cam 123 becomes smallest, so that the rotational speed Vs of the mandrel driving cam 123 becomes the maximum rotational speed Va.

If the cam unit 120 were not present, since the mandrel 140 is positioned to be parallel to the x-axis, the transfer speed of the base member would become the minimum transfer speed V1.

Referring to FIG. 5B, the angle θ of the cam follower 122 is 90° and the mandrel 140 is positioned in the first quadrant between the x-axis and the y-axis.

Since the rotation radius with respect to the rotational axis of the mandrel driving cam 123 is longer than the minimum rotation radius, the rotational speed Vb of the mandrel driving cam 123 is less than the maximum rotational speed Va.

If the cam unit 120 were not present, since the mandrel 140 is positioned in the first quadrant between the x-axis and the y-axis, the transfer speed V2 of the base member would be greater than the minimum transfer speed V1.

Referring to FIG. 5C, the angle θ of the cam follower 122 is 180° and the mandrel 140 is positioned to be parallel to the y-axis. In this position, the cam follower 122 is located farthest away from the rotational axis of the mandrel driving cam 123. Therefore, the rotation radius with respect to the rotational axis of the mandrel driving cam 123 becomes largest, such that the rotational speed Vs of the mandrel driving cam 123 is the minimum rotational speed Vc.

If the cam unit 120 were not present, since the mandrel 140 is positioned to be parallel to the y-axis, the transfer speed of the base member would become the maximum transfer speed V3.

Referring to FIG. 5D, the angle θ of the cam follower 122 is 270° and the mandrel 140 is positioned in the second quadrant between the x-axis and the y-axis.

Since the rotation radius with respect to the rotational axis of the mandrel driving cam 123 is shorter than a maximum rotation radius, the rotational speed Vd of the mandrel driving cam 123 is greater than the minimum rotational speed Vc.

If the cam unit 120 were not present, since the mandrel 140 is positioned in the second quadrant between the x-axis and the y-axis, the transfer speed V4 of the base member would be less than the maximum transfer speed V3.

Referring to FIG. 5E, the angle θ of the cam follower 122 is 360° and the mandrel 140 is positioned again to be parallel to the x-axis.

The cam follower 122 is located again closest to the rotational axis of the mandrel driving cam 123. Therefore, the rotation radius with respect to the rotational axis of the mandrel driving cam 123 becomes smallest again, such that the rotational speed Vs of the mandrel driving cam 123 becomes the maximum rotational speed Ve again.

If the cam unit 120 were not present, since the mandrel 140 is positioned to be parallel to the x-axis, the transfer speed of the base member would become the minimum transfer speed V5.

When the cam follower 122 rotates once during one cycle or timing period T, the mandrel 140 rotates a half cycle. Referring to FIG. 6, the rotational speeds Va, Vb, Vc, Vd, and Ve of the mandrel driving cam 123 at various timing points may compensate for the transfer speeds V1, V2, V3, V4, and V5 of the base member depending on the position of the mandrel 140. Therefore, the rotational speeds Va, Vb, Vc, Vd, and Ve of the mandrel driving cam 123 and the transfer speeds V1, V2, V3, V4, and V5 of the base member may become complementary, thereby constantly maintaining a transfer speed Vm of the base member 150. Therefore, the winding speed of the base member 150 may be maintained and the difference in the tension applied to the base member 150 can be minimized or reduced.

Figure 7:
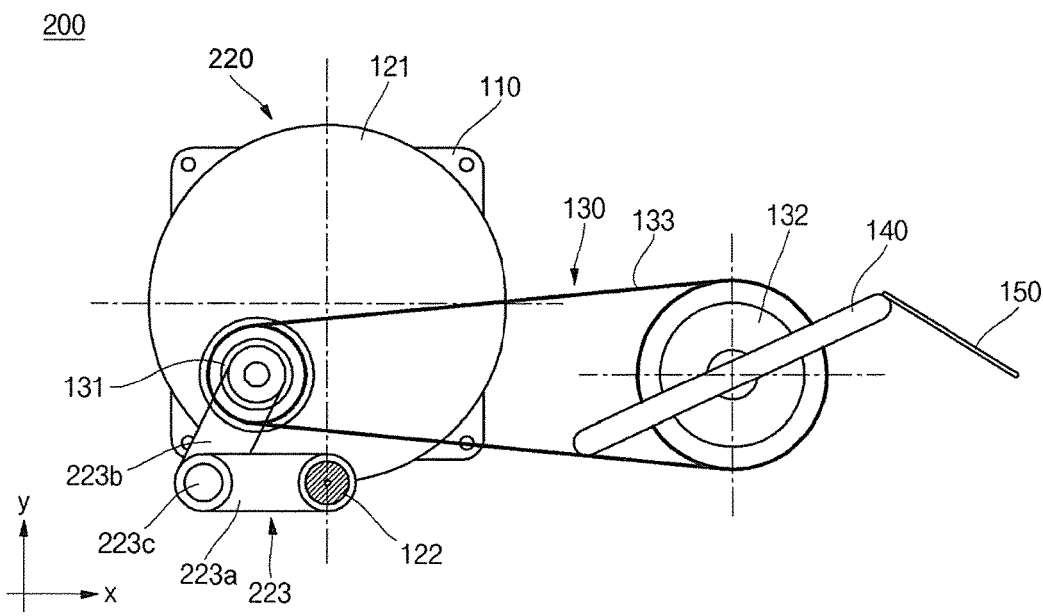
FIG. 7 is a side view of a winding unit of an apparatus for winding an electrode assembly according to another embodiment of the present invention.

FIG. 7 is a side view of a winding unit of an apparatus for winding an electrode assembly according to another embodiment of the present invention.

Referring to FIG. 7, a winding unit 200 according to another embodiment of the present invention may include the motor unit 110, a cam unit 220, the power transmission unit 130, and the mandrel 140 for winding the base member 150. The same functional components are denoted by the same reference numeral, and the following description will focus on differences between the present embodiment and the previously described embodiments.

According to an embodiment, the cam unit 220 may include the base cam 121, the cam follower 122, and a mandrel driving cam 223.

The mandrel driving cam 223 may include a cam follower coupling unit 223a, a rotational axis coupling unit 223b, and a link unit 223c.

The cam follower coupling unit 223a may be substantially bar-shaped. The cam follower 122 may pass through one end of the cam follower coupling unit 223a to be coupled thereto, and may rotate.

The rotational axis coupling unit 223b may be substantially bar-shaped. One end of the rotational axis coupling unit 223b is connected to the power transmission unit 130. The one end of the rotational axis coupling unit 223b connected to the power transmission unit 130 may form a different rotational axis from the rotational axis of the base cam 121. Since the rotational axis of the mandrel driving cam 223 is different from the rotational axis of the base cam 121, the rotational speed of the mandrel 140 may vary.

The link unit 223c connects the cam follower coupling unit 223a to the rotational axis coupling unit 223b. Therefore, when the cam follower 122 rotates, the cam follower coupling unit 223a and the rotational axis coupling unit 223b may form a constant angle with respect to the link unit 223c.

Therefore, the mandrel driving cam 223 may transfer the power transferred to the base cam 121 to the power transmission unit 130. In addition, when the cam follower 122 is located closest to the rotational axis of the mandrel driving cam 223, the angle formed between the cam follower coupling unit 223a and the rotational axis coupling unit 223b becomes 0°. In addition, when the cam follower 122 is located farthest away from the rotational axis of the mandrel driving cam 223, the angle formed between the cam follower coupling unit 223a and the rotational axis coupling unit 223b becomes 180°.

Since the mandrel driving cam 223 includes the link unit 223c, the mandrel driving cam 223 may have a greater degree of freedom in the variation in the rotational speed of the mandrel 140 than the mandrel driving cam 123.

Figure 8:
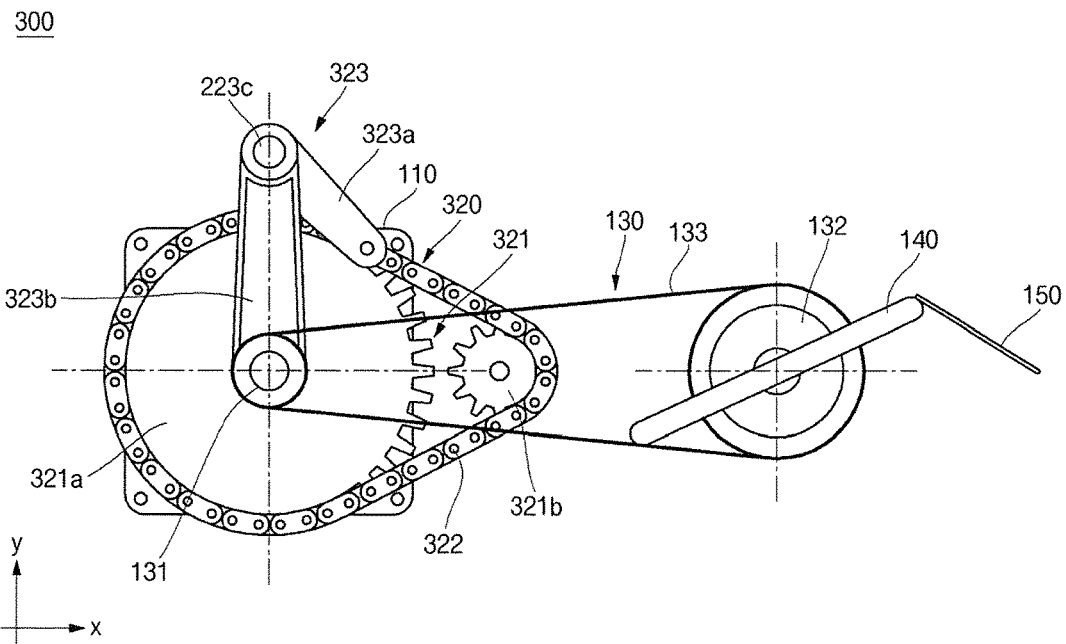
FIG. 8 is a side view of a winding unit of an apparatus for winding an electrode assembly according to still another embodiment of the present invention.

FIG. 8 is a side view of a winding unit of an apparatus for winding an electrode assembly according to still another embodiment of the present invention.

Referring to FIG. 8, a winding unit 300 according to still another embodiment of the present invention may include the motor unit 110, a cam unit 320, the power transmission unit 130, and the mandrel 140 for winding the base member 150. The same functional components are denoted by the same reference numerals, and the following description will focus on differences between the present embodiment and the previously described embodiments.

According to an embodiment, the cam unit 320 may include a base cam 321, a chain 322, and a mandrel driving cam 323.

The base cam 321 may include a disk-shaped first gear 321*a* and a disk-shaped second gear 321*b*. The center of a surface of the first gear 321*a* is connected to the motor unit 110. Therefore, power of the motor unit 110 is transferred to the first gear 321*a*, such that the motor unit 110 rotates at a constant angular speed using the center of the first gear 321*a* as a rotational axis.

The second gear 321*b* is connected to the first gear 321*a* through the chain 322, such that the chain 322 rotates at the constant angular speed together with the second gear 321*b*.

The mandrel driving cam 323 may include a chain coupling unit 323*a*, a rotational axis coupling unit 323*b*, and the link unit 223*c*.

The chain coupling unit 323*a* may be substantially bar-shaped. One end of the chain coupling unit 323*a* is coupled to the chain 322.

The rotational axis coupling unit 323*b* may be substantially bar-shaped. One end of the rotational axis coupling unit 323*b* is connected to the power transmission unit 130. The one end of the rotational axis coupling unit 323*b* connected to the power transmission unit 130 may form the same rotational axis as the rotational axis of the first gear 321*a* of the base cam 321.

The mandrel driving cam 323 rotates along the chain 322 rotating about the first gear 321*a* and the second gear 321*b*. Therefore, even if the first gear 321*a* of the base cam 321 and the mandrel driving cam 323 form the same rotational axis, the rotational speed of the mandrel 140 may vary. That is, the first gear 321*a* and the second gear 321*b* have the same configuration and effect as those of the rotational axis of the mandrel driving cams 123 and 223, which are spaced apart from the rotational axis of the base cam 121.

In addition, the same effect of adjusting the position of the second gear 321*b* can be achieved by adjusting the distances a and b between the rotational axis of the mandrel driving cam 123, 223 and the rotational axis of the base cam 121 according to the position of the mandrel 140. Therefore, the position of the mandrel 140 can be determined based on the position of the second gear 321*b*.

Since the base cam 321 includes the first gear 321*a* and the second gear 321*b*, the rotational speed of the mandrel 140 can be varied while allowing the rotational axis of the mandrel driving cam 323 to coincide with the rotational axis of the base cam 321.

While the apparatus for winding an electrode assembly according to the present invention has been particularly shown and described with reference to some exemplary embodiments thereof, it will be understood by those of ordinary skill in the art that various changes in form and details may be made therein without departing from the spirit and scope of the present invention as defined by the following claims.

What is claimed is:

1. An apparatus for winding an electrode assembly, the apparatus comprising a winding unit comprising:
   a motor unit to supply a winding power;
   a cam unit connected to the motor unit and configured to rotate when the motor unit supplies the winding power;
   a power transmission unit connected to the cam unit; and
   a plate-shaped mandrel connected to the power transmission unit and configured to receive a first electrode plate, a second electrode plate, and a separator wound thereon,
   wherein a first rotational speed provided to the plate-shaped mandrel by the cam unit and the power transmission unit when a lateral surface of the plate-shaped mandrel is positioned to be parallel with a supplying direction in which a base member including the first electrode plate, the second electrode plate, and the separator is supplied to the plate-shaped mandrel is greater than a second rotational speed provided to the plate-shaped mandrel by the cam unit and the power transmission unit when the lateral surface of the plate-shaped mandrel is positioned to be perpendicular to the supplying direction.

2. An apparatus for winding an electrode assembly, the apparatus comprising a winding unit comprising:
   a motor unit to supply a winding power;
   a cam unit connected to the motor unit and configured to rotate when the motor unit supplies the winding power;
   a power transmission unit connected to the cam unit; and
   a mandrel connected to the power transmission unit and configured to receive a first electrode plate, a second electrode plate, and a separator wound thereon,
   wherein the cam unit comprises:
   a disk-shaped base cam connected to the motor unit;
   a cam follower at a side of a surface of the base cam; and
   a mandrel driving cam having one end connected to the cam follower and another end connected to the power transmission unit.

3. The apparatus of claim 2, wherein the mandrel driving cam has a hole at the one end, and the cam follower is inserted in the hole to be connected to the mandrel driving cam, the cam follower being configured to move through the hole while rotating.

4. The apparatus of claim 2, wherein the mandrel driving cam rotates about a different rotational axis than the base cam.

5. The apparatus of claim 4, wherein when the cam follower is located closest to the rotational axis of the mandrel driving cam, the mandrel is positioned to be parallel with a direction in which a base member including the first electrode plate, the second electrode plate, and the separator stacked on the mandrel is supplied, and when the cam follower is located farthest away from the rotational axis of the mandrel driving cam, the mandrel is positioned to be perpendicular to the direction in which the base member including the first electrode plate, the second electrode plate, and the separator stacked on the mandrel is supplied.

6. The apparatus of claim 2, wherein the power transmission unit comprises a first roller, a second roller, and a belt, a circumference of the first roller is two times a circumference of the second roller, and the first roller and the second roller are connected by the belt.

7. The apparatus of claim 2, wherein the mandrel driving cam comprises a cam follower coupling unit, a rotational axis coupling unit, and a link unit, the cam follower passes through one end of the cam follower coupling unit to be coupled thereto and rotate, the rotational axis coupling unit is connected to the power transmission unit, and the link unit connects the cam follower coupling unit with the rotational axis coupling unit.

8. An apparatus for winding an electrode assembly, the apparatus comprising a winding unit comprising:
   a motor unit to supply a winding power;
   a cam unit connected to the motor unit and configured to rotate when the motor unit supplies the winding power;
   a power transmission unit connected to the cam unit; and
   a mandrel connected to the power transmission unit and configured to receive a first electrode plate, a second electrode plate, and a separator wound thereon,
   wherein the cam unit comprises:
   a base cam including a first gear connected to the motor unit, and a second gear connected to the first gear;
   a chain connecting the first gear and the second gear to each other; and
   a mandrel driving cam including one end connected to the chain and another end connected to the power transmission unit.

9. The apparatus of claim 8, wherein the mandrel driving cam includes a chain coupling unit, a rotational axis coupling unit, and a link unit, one end of the chain coupling unit is coupled to the chain, the rotational axis coupling unit is connected to the power transmission unit, and the link unit connects the chain coupling unit with the rotational axis coupling unit.

10. The apparatus of claim 8, wherein the mandrel driving cam rotates about a same rotational axis as the base cam.

* * * * *